H. J. MOORHOUSE.
ILLUSORY THEATRICAL DEVICE FOR VAUDEVILLE ACTS.
APPLICATION FILED SEPT. 2, 1913.

1,090,741.

Patented Mar. 17, 1914.

WITNESSES
Frank C. Palmer
C. Bradway

INVENTOR
Henry J. Moorhouse
BY Munn & Co.
ATTORNEYS

H. J. MOORHOUSE.
ILLUSORY THEATRICAL DEVICE FOR VAUDEVILLE ACTS.
APPLICATION FILED SEPT. 2, 1913.

1,090,741.

Patented Mar. 17, 1914.

WITNESSES
Frank C. Palmer
C. Bradway

INVENTOR
Henry J. Moorhouse
BY Munn & Co
ATTORNEYS

H. J. MOORHOUSE.
ILLUSORY THEATRICAL DEVICE FOR VAUDEVILLE ACTS.
APPLICATION FILED SEPT. 2, 1913.

1,090,741.

Patented Mar. 17, 1914.
5 SHEETS—SHEET 3.

WITNESSES
Frank C. Palmer
C. Bradway

INVENTOR
Henry J. Moorhouse
BY Munn & Co
ATTORNEYS

H. J. MOORHOUSE.
ILLUSORY THEATRICAL DEVICE FOR VAUDEVILLE ACTS.
APPLICATION FILED SEPT. 2, 1913.

1,090,741.

Patented Mar. 17, 1914.

WITNESSES
Frank C. Palmer
C. Bradway

INVENTOR
Henry J. Moorhouse
BY Munn & Co
ATTORNEYS

H. J. MOORHOUSE.
ILLUSORY THEATRICAL DEVICE FOR VAUDEVILLE ACTS.
APPLICATION FILED SEPT. 2, 1913.

1,090,741.  Patented Mar. 17, 1914.
5 SHEETS—SHEET 5.

WITNESSES
Frank C. Palmer
C. Bradway

INVENTOR
Henry J. Moorhouse
BY Munn & Co.
ATTORNEYS

UNITED STATES PATENT OFFICE.

HENRY JAMES MOORHOUSE, OF SUPERIOR, WISCONSIN.

ILLUSORY THEATRICAL DEVICE FOR VAUDEVILLE ACTS.

1,090,741.  Specification of Letters Patent.  Patented Mar. 17, 1914.

Application filed September 2, 1913. Serial No. 787,640.

*To all whom it may concern:*

Be it known that I, HENRY J. MOORHOUSE, a citizen of the United States, and a resident of Superior, in the county of Douglas and State of Wisconsin, have invented a new and Improved Illusory Theatrical Device for Vaudeville Acts, of which the following is a full, clear, and exact description.

This invention relates to a stage appliance designed for use in a vaudeville act to produce an illusory or mystic effect, and it relates more particularly to a device adapted for use in connection with stereopticon, motion or other pictures.

The invention has for one of its objects to provide a novel form of picture screen in the form of a rotary disk or wheel which has only about one-quarter of its area colored white, while the rest is black, the white area being divided into a plurality of angularly displaced radial sections of sector form, so that in rotating at a suitable speed the entire disk appears white, so as to receive the pictures projected thereon.

Another object of the invention is the provision of a rotary screen of the character referred to which has an opening at its center to which is applied a shield or other support capable of holding a dummy bust veiled and draped to represent a living woman, such shield and bust being capable of separation into parts, so that it can be passed through the opening, while an umbrella or other screen is held in front of the latter, to enable a woman from behind the screen to insert her head, shoulders and bosom through the opening to take the place of the dummy. After simulating the inanimate dummy the performer becomes animated and sings a song or performs any other action, after which the umbrella, which formerly served as a screen or shield, is raised and opened by the performer so that it will appear at the center of the picture screen and over herself. The projecting machine, before the placing of the umbrella, projects upon the performer an exact image of herself, so that when the umbrella is placed between her and the audience, such image will appear on the umbrella. She then withdraws herself rearwardly through the opening and closes the umbrella gradually and withdraws it also, her picture, however, being still projected on the screen, which latter has false segments which move inwardly toward the center of the opening as or before the umbrella closes, so that the opening will not appear at the center of the screen. The manner in which the performer appears and disappears produces a marvelous, mystical effect on the audience.

A further object of the invention is the novel arrangement of false segments and means for throwing the same into and out of the central opening, such segments serving when in their innermost position to create the impression that the picture screen or disk is completely white from the center to the periphery, and when the segments are in their outermost position the dummy-supporting shield can be applied to the screen and the shield and dummy can be taken apart and passed through the opening in the screen.

With such general objects in view, and others as will appear as the description proceeds, the invention comprises various novel features of construction and arrangement of parts which will be particularly set forth in the following description and appended claims.

In the drawings, which illustrate one embodiment of the invention, and wherein similar reference characters are employed to designate corresponding parts in all the views, Fig. 3 is a rear view of the screen disk or wheel, showing the means for moving the opening obliterating or false segments into or out of the opening; Fig. 3ª is a perspective view of one of the said segments; Fig. 4 is an enlarged front view of the shield; Fig. 5 is a central vertical section of the shield with the dummy therein.

Referring to the drawing, A designates a black plush or other curtain which is supported in any approved manner on the stage, black being the preferable color as it assists in bringing out the projected pictures more sharply. The major portion of the screen is open at the center to accommodate the rotating screen-forming wheel or disk B, which is circular and lies centrally within the curtain or back ground A, so that the latter forms a border. The front face of the wheel B has four white sectors or panels 1, arranged at 90° apart, while the area between adjacent panels is covered with black plush 2. This screen disk B is rotatably mounted and is adapted to revolve at 120 revolutions per minute, more or less, whereby the entire face of the disk becomes white due to the white panels 1, which in reality cover about one-third or one-fourth of the entire area of the disk. These white panels are designated with the letters or symbols standing for the cardinal points of the compass, and this, taken in connection with the fact that mystical effects are produced by the apparatus, will make the name "mystical compass" appropriate for designating the device and vaudeville act in which it is used. The disk or wheel B, which in diameter is twelve feet more or less, has a central opening 3 of considerable size, and around this opening and secured to the rear side of the wheel is a cylindrical hub or pulley 4 which fits over a cylindrical axle 5 on which the screen wheel rotates, there being races of anti-friction devices 6 between the hub and axle. The hub has a peripheral groove 7 in which runs a belt 8 driven by a suitably-arranged motor whereby the screen disk or wheel is rotated. The axle 5 is supported about eight feet above the stage floor on a frame C which is rigidly fastened to the stage floor.

Figures 3, 3A, 4, 5:
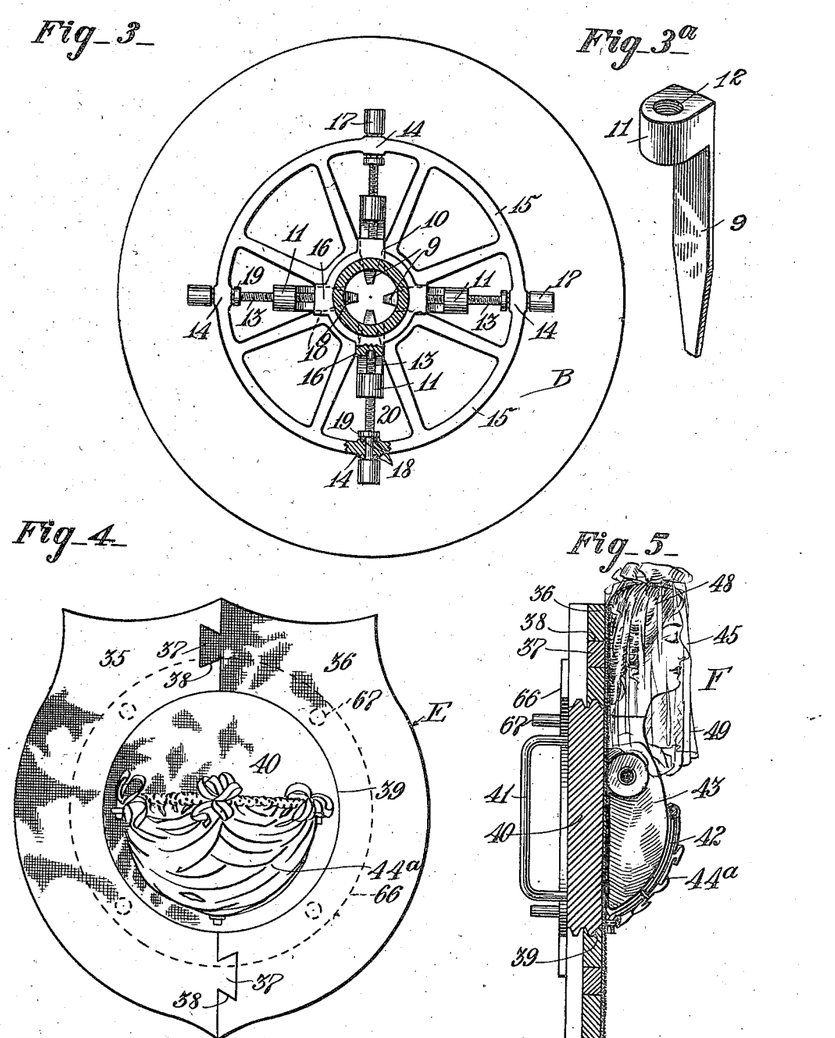

In order to obliterate the central opening 3 of the screen a plurality of radially-slidable segments 9, as shown in Figs. 3, 3ª and 6, are provided, such segments moving radially of the opening 3 toward or from the center and being disposed behind the disk or wheel B. These segments are slidable in guideways 10 formed between the hub 4, and the disk B, and each segment has on its outer end a head 11 which is provided with a threaded passage 12 in which is engaged an adjusting screw 13. These screws are rotatably mounted in bearings 14 in the annular frame 15 secured to the rear of the disk B, and in bearings 16 in the hub 4. By rotating the screws 13 in one direction the segments 9 move inwardly, and by rotating the screws in the opposite direction the segments move outwardly. Each screw 13 has on its outer end a cylindrical head 17 disposed outwardly from the bearing 14, and between the latter and head 17 are anti-friction balls 18. On each screw inwardly from its bearing 14 is a collar 19 which has between it and the bearing 14 anti-friction balls 20. This manner of mounting the screw in the bearing 14 effectively withstands the longitudinal thrust of the screw in both directions and allows the screws to be easily turned. The turning of the screws 13 is effected by a shoe D which is located adjacent the bottom of the screen and to the rear thereof, such shoe having spaced friction elements 21 and 22 which, by lateral shifting of the shoe D, can be thrown into the path of the heads 17 of the screws 13, so that as the screen turns, the heads or rollers 17 will strike the shoe and receive therefrom one or more turns every time a screw passes the shoe. The shoe is mounted on horizontally slidable rods 23 disposed in bearings 24, and these rods are connected with a lever 25 fulcrumed at 26 in a supporting bracket 27 at the base of the frame C. The upper end of the lever has a locking bolt or latch 28 engageable in a notch 29 of a fixed segment 30 secured to the frame C, and when the latch is engaged in the notch 29, the shoe is in its central or neutral position, so that the screen B can rotate without the opening obliterating segments 9 being moved. By shifting the shoe to the right, Fig. 6, the member 21 of the shoe will engage the heads of the screws and cause the latter to move the segment 9 in one direction, and movement of the shoe to the left will engage the member 22 with the heads of the screws and cause them to move the segments 9 in the opposite direction. The lever 25 is located behind the screen and is adapted to be manipulated by the performer or her attendant. It is to be understood that the inner tips of the segments 9 are colored white so as to coöperate with the canvas covered panels 1 of the screen to obliterate the opening 3 of the latter. These segments 9 extend inwardly over a lock ring 31 which screws on the front end of the axle 5, there being a shoulder or annular flange 32 on the ring 31 to engage a shoulder 33 on the hub 4 of the screen B, so as to hold the screen on the axle. The front face of this lock ring 31 has a covering 34 of black plush to correspond with the black sections of the screen.

Figure 2:
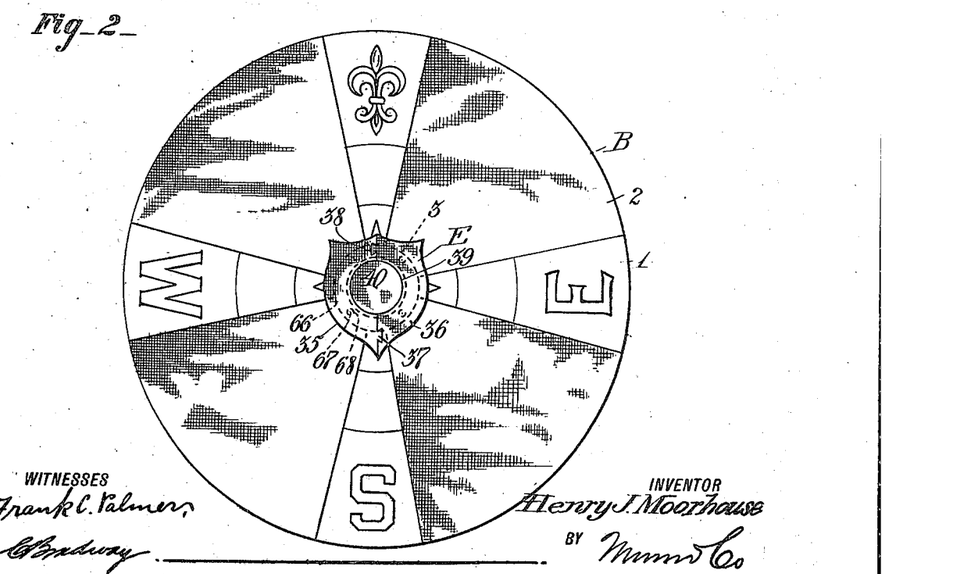
Fig. 2 is a view of the screen with the dummy-supporting shield in place.
Figure 6:
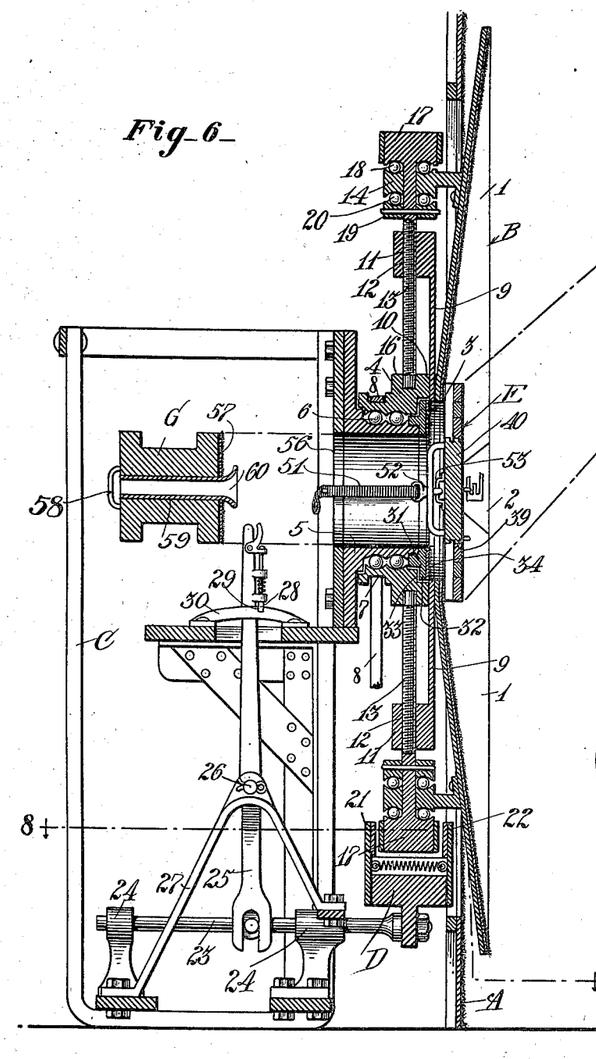
Fig. 6 is a central vertical section of the complete machine.
Figure 7:
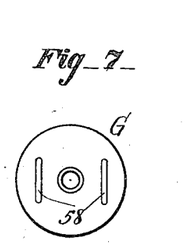
Fig. 7 is a rear view of the filler or spool for the axle of the screen.
Figure 8:
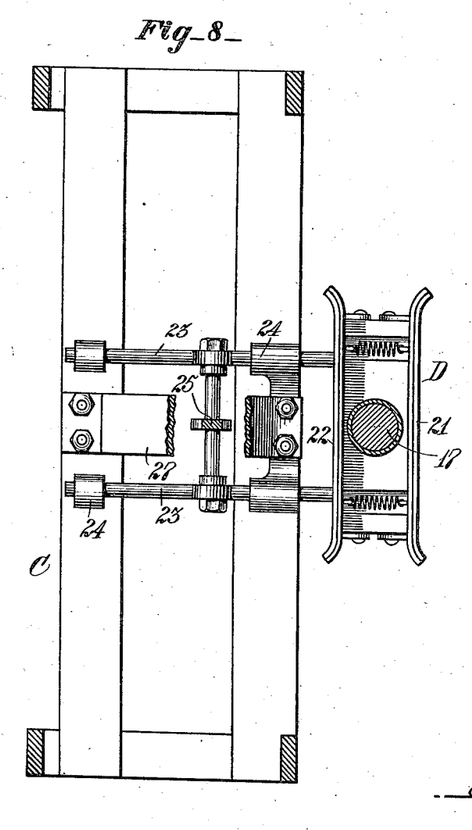
Fig. 8 is a horizontal sectional view on the line 8—8 of Fig. 6.
Figure 9:
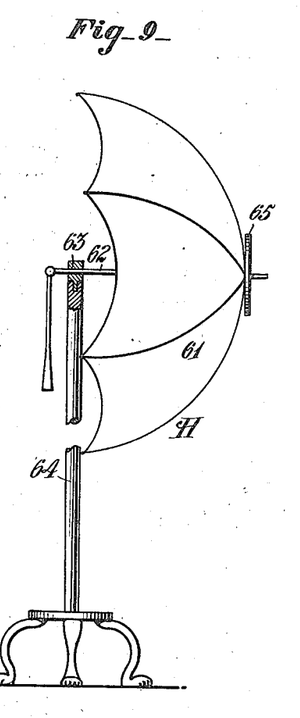
Fig. 9 is a side view of the umbrella and its supporting stand.
Figure 10:
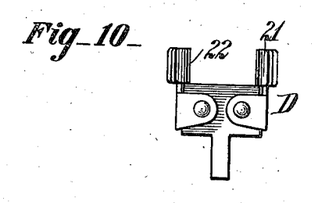
Fig. 10 is an end view of the shoe for operating the opening obliterating segments of the screen.
Figure 11:
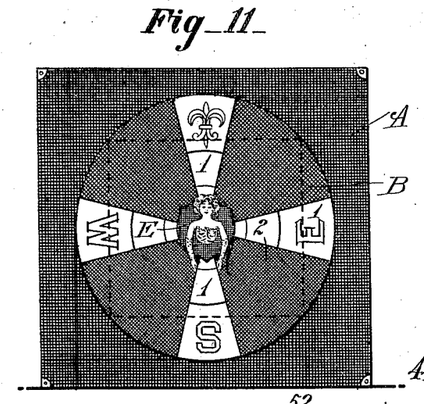
Fig. 11 is a front view of the complete device with the woman performer appearing in the shield.
Figure 12:
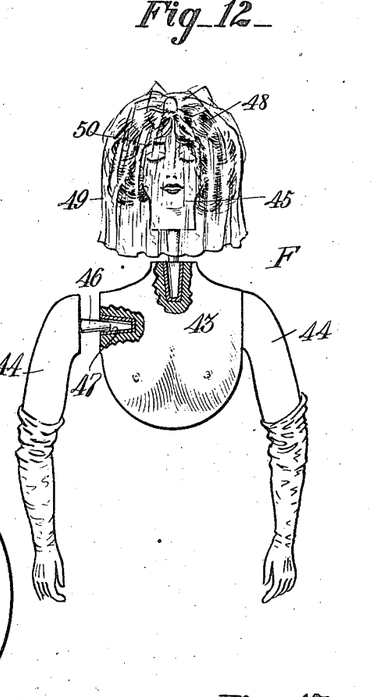
Fig. 12 is a front view drawn on an enlarged scale of the dummy figure.
Figures 13, 14:
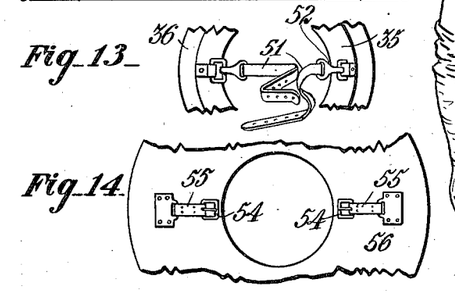
Fig. 13 is a fragmentary rear view of the outer segments of the shield.
Fig. 14 is a fragmentary rear view of the rear plate of the axle.
Figure 15:
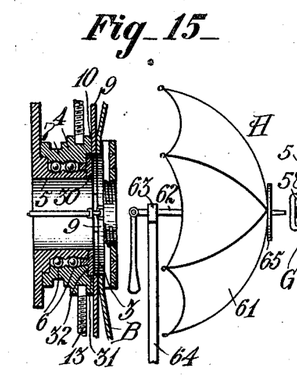
Figs. 15 to 17 are sectional views showing the relation of the umbrella to the central opening of the screen and the manner of withdrawing the umbrella through the screen.

At the central opening 3 of the screen is adapted to be placed a shield or equivalent device E which serves to support the bust of a dummy figure F, as shown in Fig. 5. This shield is intended to be taken apart and removed through the axle 5, and for this purpose the shield is, as shown in Fig. 4, made in two sections 35 and 36, separable in a vertical central plane, each section having a dove-tailed lug 37 to engage in or interlock with a dove-tailed groove 38 in the other section. Within the shield E is a central opening 39 which is slightly smaller in diameter than the diameter of the bore of the axle 5, and screwed into the central opening 39 is a plate or disk 40 which on its rear side has a handle 41 for enabling the disk to be unscrewed from the rear side and through the axle 5. On the front side of the disk or plate 40 of the shield is a pocket formed by a frame 42 which is adapted to receive the body portion 43 of the dummy F, said frame having a drapery 44ª to represent a bodice in décolleté. This dummy figure F has its arms 44, as well as the head 45, detachable from the body 43, so that all the parts can be dismembered and passed through the hub 5. The arms and head are provided with tapering pins 46 which enter metallic sockets 47 anchored in the body 43, the parts of the figure being preferably made of papier mâché, although any other light material may be employed. The head 45 is provided with a wig 48, and draped over the head is a veil 49, the eyes 50 being closed to give more clearly the impression of inanimation. The shield or support E is fastened to the screen B at the opening 3 thereof by means of straps 51 which have snap hooks 52 attached to their front ends that engage in eyes or loops 53 on the rear sides of the sections 35 and 36 of the shield E, and these straps extend longitudinally of the axle 5 and are engaged with buckles 54 attached to straps 55 that are secured to the rear side of the rear plate 56 of the hub 5. The straps 51 are close to the wall of the bore of the hub 51, so as not to interfere with the rearward withdrawal of the central section 40 of the shield. When the shield E is applied to the screen it has the appearance shown in Fig. 2, except that the central section of the shield is shown removed. When the shield E and dummy figure F are taken off the screen and passed rearwardly through the axle, a spool or filler piece G, Figs. 6 and 7, is inserted in the bore of the axle to fill the latter, the front side of the spool G having a cover 57 of black plush, and on the rear side of the spool are handles 58 to enable the spool to be easily picked up and inserted or removed. The center of the spool G is provided with a bore 59 that at its forward end has a flaring mouth 60 through which the umbrella H is inserted. The umbrella H has a white cloth covering 61, as it is adapted to form part of the screen during certain stages in the performance. The handle 62 of the umbrella is adapted to be held in a head 63 on the upper end of a standard 64, Figs. 9 and 15. This standard is placed on the stage directly in front of the screen so that the umbrella when open can cover the center of the screen B. The bore of the spool G is large enough to enable the performer to insert her hand through the same and draw in the handle of the umbrella, and also to close the latter when in the position shown in Fig. 16. After the umbrella is closed it is drawn rearwardly through the spool to the position shown in Fig. 17, whereby the white ring or disk 65 on the tip of the umbrella closes the mouth 60 of the spool or filler piece G.

Figure 1:
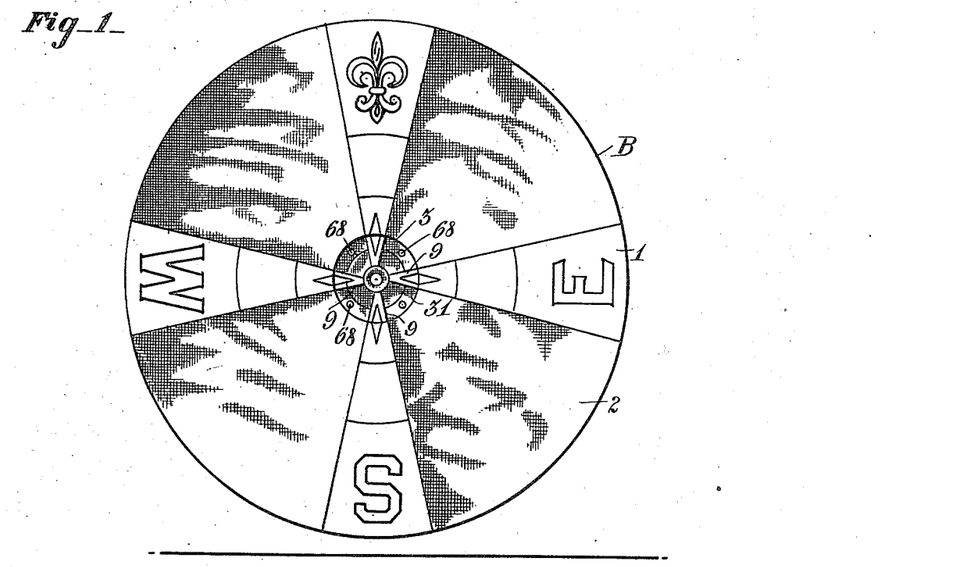
Figure 1 is a front view of the screen, showing the same in condition for producing the effect when rotating when the entire screen is white.

To cause the shield E to be held in fixed position the rear side of the shield has fastened thereto a ring 66, Figs. 4 and 5, on which are rearwardly projecting pins or lugs 67 that engage in openings 68 in the locking ring 31, such openings being clearly shown in Fig. 1. The straps 51 hold the pins 67 engaged in the openings or sockets 68, thus preventing the person who enters from shoving the shield outward.

Figure 16:
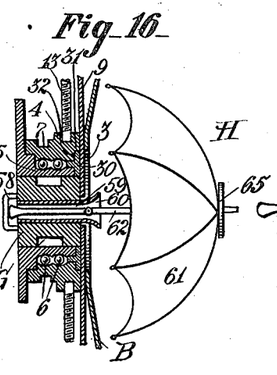
Figure 17:
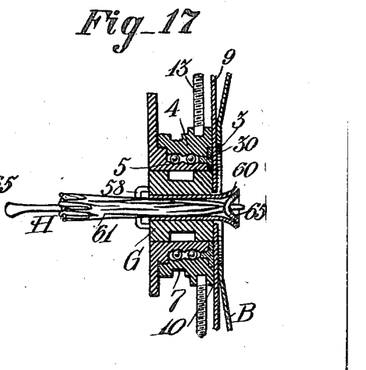

In performing the vaudeville act with the machine hereinbefore described it is necessary to have at least three persons to carry out the parts, one being a woman who takes the place of the dummy in the final stage of the act, and two men, preferably represented as sailors. The machine is placed as far back as possible on the stage so that a projecting machine placed at the footlights can project a picture on the rotating wheel. When the curtain goes up the wheel has the appearance as shown in Fig. 1, so that the mystic compass will be revealed to the audience, and to increase the nautical effect a steering wheel and other appurtenances of a ship may be arranged on the stage. At the beginning of the act the two sailors appear, the first sailor being the one who attends to the operation of the machine, and the other being a lovelorn young man who complains about having to leave home and seems much downhearted because of long absence from his sweetheart. About to go on watch he is twitted by the first sailor, who is somewhat of a practical joker and who exacts a promise from the second sailor that if the latter will assist him in fixing the compass he, the second sailor, will be contented to remain on watch and on board the vessel. At this point the compass, which is of course brilliantly illuminated by the footlights, begins slowly to revolve, until it attains a speed of about one hundred and twenty revolutions per minute. The two sailors then approach the compass with a large black shield E, and by ascending an elevated stand place the shield at the center of the revolving wheel B, after of course the false segments 9 have been retracted by the woman at the rear of the machine throwing the lever 25 in a direction to cause such segments to be retracted. She removes the spool G, and by means of the straps 51 fastens the shield in place. The lovelorn sailor now retires to one side of the stage, and the first sailor, to make the surprise more complete, places the stand 64 in front of the wheel and as near the shield as possible, and on the stand places the umbrella H. The umbrella obstructs the view of the second sailor from the shield and also the view of one-half the audience. The first sailor proceeds to build up the dummy in the view of the other half of the audience. The second sailor becoming somewhat curious walks to the other side of the stage, but the first sailor anticipating this movement throws the umbrella to cut off the view of the second sailor, and at the same time exposes to the view of the first half of the audience the dummy that he is placing on the shield. As the work proceeds, the second sailor becomes impatient and approaches the shield from the front, but the first sailor immediately swings the umbrella around to the center, thereby cutting off the view of the entire audience from the shield. At this point the woman behind the wheel removes the central portion of the shield after the first sailor takes off the head and arms from the dummy, and when the center of the shield is taken out he passes these parts of the dummy through the opening. The woman quickly places her head and shoulders and arms through the opening in exactly the same position that the dummy occupied, and while the first sailor is in the act of draping the veil over her face the second sailor, who is by this time impetuous, carries away the umbrella and stand, but soon drops them when he sees what is exposed on what to him was previously a blank shield. The first sailor now steps down from the stand on which he was mounted when placing the dummy, so as to get the umbrella, and during this time the second sailor mounts the stand and soon becomes enchanted with the figure displayed in the shield. He takes hold of her hands, as well as her head, and produces movements which are decidedly mechanical, the eyes of the woman being closed, as with the dummy, so as to increase the inanimate impression. The second sailor can not be induced to leave the object of his worship and thereupon the first sailor hands him the umbrella to place in the hands of the apparent dummy. At this moment pictures are thrown upon the screen with the centers blank so that only a white light will appear on the shield and the figure. The figure now removes the veil and opens her eyes and sings a song. Next there is thrown upon her and the shield a picture which is the exact representation of herself and the shield. She now opens the umbrella, which is white, so as to catch the projected picture of herself, and thereupon immediately withdraws her body from the opening in the wheel, and the first sailor, who, in the meantime, has gone to the back of the wheel, unstraps the remaining part of the shield and takes it rearwardly through the opening. The spool G is then inserted in the axle and then the umbrella is passed through the spool, as shown in Fig. 16. At about this time the lever 25 is operated to cause the false segments 9 to move inwardly in the opening 3 of the wheel. Thereupon the umbrella is closed and drawn completely through the spool G, as shown in Fig. 17, the projected picture of the woman being now taken up by the central part of the wheel. By a gradual dissolving effect the picture fades away and there is nothing left but the bare wheel as it appeared in the beginning of the act.

Having thus described my invention, I claim as new and desire to secure by Letters Patent:

1. A revolving moving picture or other screen consisting of a wheel having white sections and intermediate dark sections.

2. A revolving picture screen consisting of a wheel having radially-disposed white panels with intermediate dark areas.

3. A picture screen having a central opening through which the bust portion of a person can be exposed from the rear, and means applied to and removable from the opening for closing the opening to complete the continuity of the screen when the person is removed from the opening.

4. A picture screen having a central opening, a tubular axle at the said opening, a bearing in which the axle extends, and means for rotating the screen.

5. A picture screen having a central opening, a tubular hub on the rear of the screen, a tubular axle disposed in the hub, the bore of the axle being large enough for a person to pass therethrough, and means for rotating the screen.

6. A picture screen having a central opening, opening obliterating elements carried by the screen, and means for moving the elements radially with respect to the opening and toward and from the center thereof.

7. A picture screen having a central opening, opening obliterating elements at the rear of the screen, screws connected with the elements for moving the same toward and from the center of the opening, means for mounting the screws on the screen, means for rotating the screen, and means for turning the screws.

8. A picture screen having an opening, opening obliterating elements, means for moving the elements into and out of the opening, and means for turning the screen.

9. A picture screen having an opening, opening obliterating elements, and means for simultaneously moving the elements into and out of the opening.

10. A picture screen having an opening, means for rotating the screen, opening obliterating elements on the screen, means rotating with the screen for throwing the elements into and out of the opening, and a device normally out of engagement with the last mentioned means and movable into engagement therewith for actuating the said elements.

11. A picture screen having an opening, means for rotating the screen, opening obliterating elements on the screen, screws rotatably mounted at the rear of the screen and connected with the elements for moving the same into and out of the opening, a shoe normally disposed out of the path of the screws, and means for moving the shoe to engage the screws for turning the same in either direction.

12. A revolving picture screen having an opening at its center, with a dummy supporting element mounted fixedly at the center of the screen and composed of detachably connected parts for passage through the said opening.

13. A revolving picture screen having a central opening large enough for the passage of the bust portion of a person forwardly through the opening, a stationary element fastened at the center of the screen and having a removable central portion adapted to aline with the opening of the screen for permitting the person to appear through the said element.

14. A revolving picture screen having an opening large enough for the passage of the bust portion of a person forwardly therethrough, a dummy supporting element mounted at the said opening and having a detachable central portion disposed in alinement with and removable rearwardly through the opening in the screen and the outer portion being made in separable parts for detachment from each other and removal rearwardly through the opening of the screen, and opening obliterating elements mounted on the screen and movable into the opening when the said supporting element is removed.

15. A revolving picture screen having an opening large enough for the passage of the bust portion of a person, opening obliterating elements mounted on the screen, means for moving the elements into and out of the opening, an axle for supporting the screen, and a dummy supporting element removably fastened to the axle and composed of detachable parts of such size as to be passed rearwardly through the axle.

16. A picture screen having a central opening, means for revolving the screen, a stationary element mounted at the said opening and composed of detachable parts of such size as to be passed rearwardly through the opening, and a dummy bust mounted on the said element and composed of detachable parts of such size as to be passed through the said opening.

17. A revolving picture screen having a central opening, a tubular axle supporting the screen and large enough for the bust portion of a person to pass therethrough, a supporting element detachably mounted on the axle and composed of detachable parts of such size as to pass through the axle, and a dummy bust mounted on the supporting element and composed of detachable parts of such size as to pass through the axle.

18. A revolving picture screen having a central opening, a tubular axle supporting the screen and large enough for the bust portion of a person to pass therethrough, a supporting element detachably mounted on the axle and composed of detachable parts of such size as to pass through the axle, a dummy bust mounted on the supporting element and composed of detachable parts of such size as to pass through the axle, and opening obliterating elements mounted on the screen and movable into and out of the opening.

19. A revolving picture screen having a central opening, an axle large enough to permit the bust portion of a person to pass therethrough, a filler for the said axle and having a bore, means for mounting an umbrella in front of the opening of the screen to receive a projected picture, said umbrella being capable of withdrawal rearwardly through the said filler, and means on the umbrella for closing the end of the bore.

20. A revolving screen having a central opening, opening obliterating elements carried by the screen, an axle for supporting the screen and having a bore large enough to permit the bust portion of a person to pass therethrough, a filler for the said bore and having a central passage, means for supporting an umbrella of white color in front of the said opening of the screen to receive a projected picture, and a white element on the umbrella for closing the passage of the said filler when the umbrella is drawn into the said passage.

21. A revolving screen having a central opening, a tubular axle supporting the screen and having a passage large enough to permit the bust portion of a person to pass therethrough, a dummy supporting element removably mounted on the axle at the front of the screen and composed of detachably connected parts of such size as to pass through the axle, opening obliterating elements mounted on the screen and movable into and out of the opening, a filler adapted to be inserted in the passage of the opening and having a bore, means for supporting an umbrella of white color in front of the said element for supporting the dummy, and means on the umbrella for obliterating the bore of the said filler when the umbrella is drawn into the latter.

22. A screen having an opening, and a device mounted in front of the screen at the said opening to receive a projected picture and adapted to be withdrawn rearwardly through the said opening.

23. A screen having an opening, and an umbrella of white color removably mounted in front of the opening of the screen to cover the same and adapted to be passed rearwardly through the said opening.

24. A screen having an opening, an umbrella of white color removably mounted in front of the opening of the screen to cover the same and adapted to be passed rearwardly through the said opening, and opening obliterating elements movable into and out of the said opening.

25. A revolving screen having an opening, a support disposed in front of the screen, an umbrella detachably mounted on the support to cover the said opening and receive a projected picture, and opening obliterating means carried by the said screen and movable into and out of the said opening thereof.

26. A revolving screen having an opening, a support disposed in front of the screen, an umbrella detachably mounted on the support to cover the said opening and receive a projected picture and adapted when closed to be passed through the said opening, opening obliterating means on the said screen, and means for actuating the last mentioned means to obliterate the said opening.

27. The combination of a curtain having an opening, a revolving screen in front of the said opening, and means behind the curtain for rotating the screen.

28. The combination of a dark curtain, a revolving screen in front of the curtain and having white panels separated by dark panels, and means for rotating the screen.

29. The combination of a dark curtain, a revolving screen in front of the curtain and having white panels separated by dark panels, said screen having a central opening, and white opening obliterating elements mounted to be thrown into and out of the said opening and rotatable with the screen.

30. The combination of a dark curtain, a revolving screen in front of the curtain and having white panels separated by dark panels, said screen having a central opening, white opening obliterating elements mounted to be thrown into and out of the said opening and rotatable with the screen, means behind the screen for rotating the same, and means behind the screen for actuating the said elements.

In testimony whereof I have signed my name to this specification in the presence of two subscribing witnesses.

HENRY JAMES MOORHOUSE.

Witnesses:
 JASON D. CLARK,
 LOUIS F. NYS.